3,285,340
ACIDIZING PROPPED FRACTURES
Jimmie L. Huitt, Glenshaw, and John Papaila, Apollo, Pa., assignors to Gulf Research & Development Company, Pittsburgh, Pa., a corporation of Delaware
No Drawing. Filed July 19, 1963, Ser. No. 296,398
13 Claims. (Cl. 166—42)

This invention relates to a method for fracturing and acidizing subterranean petroleum reservoirs to increase the fluid productivity of such reservoirs.

The fracturing of subsurface formations penetrated by wells to increase the production of fluids from the formations has become a common method of stimulating wells. In the usual fracturing method, a liquid is pumped down the well under a pressure high enough to overcome the weight of the overburden and fracture the formation. Fracturing of the formation adjacent the well-bore usually is indicated by a sharp drop in the pressure required to pump the fracturing liquid into the well. A propping agent consisting of finely divided solid particles, is suspended in a liquid, which may be the fractionating liquid, and carried into the fracture. The propping particles are deposited in the fracture to maintain the faces of the fracture apart when the pressure on the fracturing liquid is released and thereby provide a fracture of high fluid carrying capacity.

Fracture width is the perpendicular distance between the opposing surfaces or faces of the fracture, and the flow capacity of an open fracture is proportional to the cube of the fracture width. One of the controlling factors affecting fracture width after the treatment is completed is the size of the propping particles employed to prevent the fractures from sealing under influence of the overburden pressure when the pressure on the fracturing liquid is released. There is an upper limit on the size of propping particles which is determined by the ability of the equipment to handle the particles and the transport of the particles into the fracture for distribution over the fracture surface. Thus, it is often desirable to increase the width of the fracture beyond that feasible merely by increasing the size of the propping particles used.

One proposed method for improving the flow capacity of a fracture involves acidizing a propped fracture which has been formed in a limestone or dolomite formation. In such a process, the acidizing treatment would be conducted in a conventional manner. In a typical acidizing treatment the well is filled with oil, and an aqueous solution containing 15 percent acid is pumped down a string of tubing from tank trucks equipped with high pressure pumps. The oil is displaced through the annular space between the tubing and the casing up to the surface and into a measuring tank where the volume displaced can be gauged. After a volume of oil equal to that of the tubing and the portion of the hole to be treated has been displaced, the outlet at the surface is closed and pumping of the acid down the tubing is continued. The head of oil in the annular space around the tubing prevents the acid from rising in the well above the desired level, and the acid is forced out into the formation. In a calcareous or dolomitic formation, the acid dissolves the rock and enlarges the channels available for flow of fluids to the well-bore. The treating time can vary from as little as a few minutes to as much as several hours, depending upon the formation properties and the volume and concentration of the acid. When the treatment is completed, the spent acid is displaced to the surface by producing the formation fluids.

Unfortunately the subsequent acidizing of propped fractures has proved to be ineffective as a means of increasing the flow capacity significantly beyond that resulting from the fracturing treatment alone. The acid reacts with the areas of the fracture face that are contiguous to the propping particles, and as a result, even after the acidizing treatment, the overburden pressure still compresses the fracture to a width determined by the size of the propping particles.

This invention resides in a method for fracturing and acidizing a subterranean rock formation whereby the acidizing treatment effects a substantial increase in the flow capacity of the fractures in the formation. In a fracturing treatment pursuant to the process of this invention, the fracturing liquid contains a propping agent consisting of a porous, particulate, deformable solid material which has been impregnated with a surfactant. The surfactant is one which will make the formation surfaces which it contacts preferentially wettable by oil and thus reduce the tendency of the treated surface areas to react with the aqueous acid solution employed in the acidizing treatment. The fracturing liquid and propping particles are introduced into the well bore under pressure sufficient to create or extend fractures in the formation. After the fracture treatment, the pressure on the fracturing liquid is reduced, the compressive forces exerted by the overburden deform the individual propping particles, and the surfactant is squeezed from the particles onto the adjacent formation surfaces to protect these surfaces from attack by the acid. Because the nature of the surfactant is such that, during the subsequent acidizing treatment, the acid does not dissolve in, nor diffuse through, the surfactant to a significant extent, the film of surfactant squeezed from the propping particle acts as a barrier between the acid and the formation surface. When the acidizing treatment is terminated, the pillars of rock remaining adjacent the propping particles act as extensions of these particles and thereby increases the effective width of the fracture.

In the process of this invention, the formation can be fractured in a conventional manner. A fracturing liquid is introduced into the well-bore and contacts the formation to be fractured. The liquid used may be one such as crude petroleum, diesel oil, kerosene, a mixture of oils, an emulsion of oil and water, or water which may or may not contain a gelling agent. The fracturing liquid can also contain suitable chemical agents or finely ground particles of solid material to produce a liquid of such viscosity and fluid loss characteristics that, although the liquid enters the formation, it does not enter so rapidly as to prevent maintenance of the necessary pressure on the fracturing liquid. Increasing pressure is applied to the fracturing liquid and thereby to the formation itself until the stresses induced cause the formation to rupture. In this manner fractures are created in or extended into the formation away from the well-bore. These fractures might enlarge previously existing natural fissures in the formation, or they might follow zones of weakness or maximum stress induced in the formation by mechanical notching, detonation of shaped charges, implosion of evacuated glass containers, or other means. Alternatively, the fractures might be generated along bedding planes or other planes of least resistance resulting from the internal stresses within the formation itself. For purposes of this invention, the manner of obtaining the fracture is immaterial.

To maintain the increased flow capacity resulting from the fracture, a suitable propping agent is injected into the fracture and is transported away from the well-bore by a liquid medium. The propping agent can be suspended in the fracturing liquid initially displaced into the well prior to the creation of the fracture, or in other instances the propping agent can be introduced in a subsequent fluid medium with properties adjusted to assure control of the placement of propping particles in the fracture. Concentration of the propping agent in the fracturing liquid ranging from about 0.1 pound up to as high as 10 pounds of propping agent per gallon of fracturing liquid can be used to prop the fracture. However, the particles tend to mat and result in a fracture of relatively low permeability if present in concentrations high enough to form a tightly packed monolayer in the fracture; therefore, concentrations less than 5 pounds per gallon of fracturing liquid are recommended. Fractures of high fluid carrying capacity are obtained when propped with a partial monolayer of propping particles which are substantially evenly distributed over the fracture face. For this reason, a concentration in the range of about 0.1 to 0.5 pound of propping agent per gallon of fracturing liquid is preferred.

After the formation is fractured, the fractures are satisfactorily propped, the fracturing pressure is released, and a suitable acid solution is injected down the well-bore and into the formation to enlarge the existing flow channels. This phase of the formation treatment places additional restrictions on the choice of a suitable propping agent.

For the process of this invention, the choice of a propping agent must satisfy three requirements. The propping particles must be sufficiently porous to contain the required volume of surfactant per particle to treat the contiguous surface areas of the formation adequately. Ordinarily, a porosity of at least three percent, or greater, will be required. However, excessive porous particles will not withstand substantial compressive stresses; therefore, a preferred range of porosity for the propping particles is from five to ten percent.

In addition to a suitable degree of porosity, the propping particles must have sufficient permeability to permit their impregnation with the surfactant and the subsequent flow of the surfactant onto the rock surfaces under pressure exerted by the overburden. A standard unit of permeability commonly used in the petroleum reservoir engineering art is the darcy. A porous body has a permeability of one darcy if it permits the flow therethrough of one cubic centimeter per second of a one-phase fluid having viscosity of one centipoise under a pressure gradient of one atmosphere per centimeter. Because many porous substances dealt with in reservoir engineering have permeabilities considerably less than one darcy, a more practical unit of permeability is the millidarcy which equals 0.001 darcy. The minimum permeability suitable for propping particles used in this invention is one millidarcy. As was stated previously the need for a certain amount of compressive strength makes an excessively high degree of porosity undesirable. To some extent, the permeability of an individual particle is a function of the percent of inter-connected porosity in that particle. Therefore, the preferred range of permeability for the propping particles lies between 10.0 and 500.0 millidarcys.

Another required characteristic of the solid propping particles is that they permit some degree of deformation under the compressive forces exerted by the overburden so that the surfactant can be squeezed from the particles when the pressure on the fracturing liquid is reduced. The choice of a specific type of propping particle exhibiting a certain degree of deformability depends partly on the subsurface depth of the formation to be treated and the weight of the overburden in a particular instance. Substantial deformation is permissible and in some instances desirable, as long as the individual propping particles have sufficient strength to prevent the fracture from closing completely prior to the acidizing treatment.

Many materials meet the requirements for propping particles inherent in the process of this invention. Among them are ground walnut shells, hickory nut shells, pecan shells; the outer capsules for Brazil nuts; the hard portion of drupes such as coconut husks and peach pits; and the like. The class of suitable propping agents is not limited to these materials and may be extended to include any material that is capable of propping a fracture created by the fluid and of depositing on the formation surfaces a sufficient quantity of surfactant to retard the reaction of the treated formation surfaces with the acid.

Individual particles of the propping agent should have a size of 4 to 40 mesh, U.S. standard sieve series. Particles of the desired size and roundness can be obtained by grinding the shells or seeds followed by a screening operation in which oversized particles are recirculated for further grinding. It is desirable that the sizes of the particles be within a narrow range of particle size, preferably spanning five screen numbers or less of the U.S. standard sieve series. For example 8 to 12 mesh, or 6 to 8 mesh, particles are particularly effective as a propping agent because each of the particles tends to support the fracture surfaces when pressure on the fracturing liquid is released, and the absence of fine particles avoids plugging of the small openings between propping particles. A classification of 8 to 12 mesh means that the particles will pass through a No. 8 screen in the U.S. standard sieve series but will be retained on a No. 12 screen of that series.

It is also desirable that the ground propping particles be highly rounded to assure that the particles will not bridge either the opening of the fracture into the well bore or some other section of the fracture located away from the well bore. For this reason, it is preferred that the propping particles employed in this process have an average sphericity and roundness above 0.7 and especially above 0.8. Sphericity is defined as the ratio of the nominal diameter of a particle to the maximum intercept of the particle. The nominal diameter of a particle is the diameter of a sphere having the same volume as the particle. The maximum intercept of the particle is the diameter of a sphere circumscribing the particle. The roundness of a particle is the ratio of the average radius of corners and edges of the particle to the radius of the maximum inscribed circle. The definitions of roundness and sphericity are those used in "Stratigraphy and Sedimentation" by Krumbein and Sloss, pages 78 through 83, published by W. H. Freeman Company, 1951 edition.

The choice of a suitable acid for the acidizing treatment is determined to a great extent by the fact that such treatments are effective only in calcareous or dolomitic formations. Hydrochloric acid is most commonly used for such processes because it is highly reactive with calcareous or dolomitic formations and can be mixed with a chemical inhibitor to the extent that it is substantially noncorrosive to steel casings and other well equipment during the treatment and does not form insoluble precipitates in the formation. Inhibitors added to hydrochloric acid to protect casings and other well equipment may be either organic or inorganic in character. The inorganic inhibitors used are generally cyanides or compounds of arsenic. Typical organic inhibitors are products such as aniline, pyridine, or organic sulphur compounds. The concentration of hydrochloric acid in the aqueous acid solution employed varies with the character of the formation and should be determined by laboratory tests on core samples. A 15 percent hydrochloric acid solution is capable of dissolving about 0.4 cubic feet of limestone per 42 gallon barrel, and acid solutions containing as little as 5 to 10 percent hydrochloric acid are often used. The viscosity of the spent acid solution in the formation is lower for treating solutions of lower acid concentration, and at concentrations greater than 20 percent hydrochloric acid, the viscosity of the spent acid solution increases rapidly. Because higher formation pressure is required to displace a highly-viscous, spent acid solution from the formation and into the well bore after the acidizing treatment is completed, solutions with acid concentrations greater than 20 percent are seldom used.

The choice of a surfactant to be used in the process of this invention depends upon the concentration of the acid solution and the composition of the formation. A wide range of substances is available to control the nature and degree of the surface wettability of subterranean rock formations. Experiments performed with core samples of the particular formation will indicate the specific surfactant that will protect the formation surfaces from reaction with the acid solution employed. Formations containing deposits of hydrocarbon fluids are generally considered to be preferentially wettable by water, and the treating solution ordinarily used in acidizing treatments is an aqueous solution of hydrochloric acid. In such a system, a preferred surfactant is one which makes the formation surface preferentially oil-wet because the change in wettability renders the treated formation surface less susceptible to attack by the acid. Those surfactants which are capable of effecting a change in surface wettability according to the process of this invention are hereinafter referred to as oil-wet surfactants. Among the compounds which can cause the desired oil-wettability in a formation are amine salts of saturated and unsaturated aliphatic carboxylic acids having from one to four carbon atoms, wherein the total number of carbon atoms in the amine salts exceeds ten but the total number of carbon atoms in the ammonium component thereof does not exceed 30, such as stearic amine acetate, palmitic amine butyrate and coconut amine propionate. The oil-wet surfactant can also be chosen from among the polyalkyleneglycol esters of fatty acids, saturated and unsaturated, having from 12 to 20 carbon atoms, such as polyethyleneglycol monoricinoleate, polyethyleneglycol monostearate, polyethyleneglycol monooleate, and polyethyleneglycol monopalmitate. Additional suitable oil-wet surfactants can be found among the polyoxyalkylene derivatives of the fatty acid esters of anhydroalkitols with carboxylic acids having from 10 to 30 carbon atoms, preferably 12 to 25 carbon atoms, such as polyoxyethylene sorbitan trioleate, polyoxyethylene sorbitan monostearate, polyoxyethylene sorbitan tristearate and polyoxypropylene sorbitan monolaurate. Other suitable oil-wet surfactants include such compounds as cyclohexylamine acetate; amine 22 (an organic base manufactured by Carbide and Carbon Chemical Company, New York, New York having the structure:

$C_{17}H_{33}-C=N-C_2H_4-N-C_2H_4OH)$ and sodium alkyl aryl sulfonates of the type commonly employed in making detergents, such as sodium decylbenzenesulfonate. Still other oil-wet surfactants can be selected from the alkyl aryl sulfonic acids, that is "wax" benzene sulfonic acids and mahogany acids and metal salts thereof, such as the alkali metal, ammonium and alkaline earth metal, including calcium and magnesium salts; sulfated fatty alcohols, such as sulfated cetyl alcohol; alkali metal soaps of fatty acids, such as sodium stearate, sodium palmitate, and sodium oleate; and alkali metal soaps of tall oil, such as the sodium soap of tall oil. The preceding list of surfactants is not exclusive but is intended only as an indication of a class of substances that would be suitable for the process of this invention.

An embodiment of this invention is illustrated by the acidizing of propped fractures in flow cells made from limestone rock samples. Each of two flow cells was constructed by molding two limestone blocks in epoxy resin leaving two ends of the cell open to permit flow of fluids therethrough. The blocks were assemblied with the mutually adjacent faces of the blocks separated by crushed walnut shells of 6 to 8 mesh, U.S. standard sieve series.

The blocks were approximately five inches long and three inches wide, and the walnut shells were distributed uniformly in a partial monolayer over the surface of the lower block at a density of about seven particles per square inch. Then the upper block of stone was placed upon the shells and a vertical force equivalent to about three thousand pounds per square inch was applied to simulate overburden pressure. The acidizing process consisted of circulating 200 ml. of 5 percent aqueous hydrochloric acid through the fracture. The total time for this acidizing treatment was approximately ten minutes. In the first test, the walnut shells were not treated with surfactant, but in the second test the walnut shells were subjeced to evacuation followed by impregnation with Span 85 (sorbitan trioleate, manufactured by Atlas Powder Company, Wilmington, Delaware) under a pressure of several thousand pounds. After impregnation of the shells, the excess Span 85 was wiped from the surface of the walnut shells.

In each test the acid removed a layer of limestone approximately 0.04 inch thick from each face of the simulated fracture. In the simulated fracture which was propped by the untreated walnut shells, the entire surface was dissolved even where it contacted the propping particles, and the resultant flow channel had essentially the same width that it had before the acid treatment. However, in the fracture propped with impregnated walnut shells, the acid did not react with the areas of the fracture face that were contiguous to the propping particles. The pillars of rock remaining adjacent the propping particles prevented the acidized fracture from closing to the width of the propping particles and maintained the flow channels at the larger width resulting from the acidizing treatment.

Because flow capacity is determined partly by fracture width, it is evident that the substantial increase in fracture width obtained by the method of this invention will result in a significant increase in flow capacity. In the test described herein, the untreated propped fracture had a width of 0.01 inch and a flow capacity of 22,000 millidarcy-feet. After the acidizing treatment, the fracture propped by impregnated walnut shells had a width of 0.09 inch and a flow capacity of 1,100,000 millidarcy-feet. The process of this invention yielded a fifty-fold increase in flow capacity for the propped fracture.

The specific embodiment of the method of this invention described above should not be construed to limit the applicability of the method. Proper selection of acids, surfactants, and propping agents will permit the use of this invention in any instance in which it is desirable to enlarge the flow channels of a rock formation. Thus, this invention might be employed to increase the flow capacity of any subsurface rock formation capable of dissolution by acid and is especially useful in limestone or dolomite formations. This process may be used in a formation containing gaseous or liquid hydrocarbons, other commercially valuable gases or other fluids such as water. In addition, this invention might be applied to increase the injection or production capacity of a dry, permeable reservoir that is intended for use in the underground storage of fluids.

Underground carbonate rock formations containing deposits of hydrocarbons or other valuable fluids often have little or no capacity to produce those fluids. Such formations can be rendered commercially productive by the process of this invention. Even in reservoirs having sufficient flow capacity initially, the pressure gradients required to drive fluids through the formation are great because of the resistance to flow exhibited by rock formations. The increase in flow capacity obtained by this process substantially reduces the flow resistance, conserves the natural reservoir energy, and increases the cumulative recovery obtainable from the reservoir. Furthermore, it is often desirable to increase the rate of injection of fluids into a formation. The large flow channels around the well-bore created by this process permit obtaining high injection rates at relatively low injection pressures. A very significant advantage of this invention is that it provides a method for obtaining a substantial increase in the flow capacity of propped fractures which have been created in underground formations.

We claim as our invention:
1. A method of increasing the productive capacity of a subterranean formation penetrated by a well, said formation being susceptible to dissolution by acid, compris- ing displacing a liquid down the well into contact with the formation, said liquid containing porous deformable propping particles impregnated with a surfactant capable of rendering the formation resistant to acid, increasing pressure on the liquid to create and extend a fracture from the well into the formation, displacing the liquid and propping particles into the fracture, reducing the pressure on the liquid whereby the fracture tends to compress the propping particles and squeeze the surfactant from the particles onto the formation surfaces adjacent the particles, thus rendering the surfactant-treated surfaces resistant to acid, and thereafter displacing acid down the well and into the fracture.

2. A method according to claim 1 wherein the propping particles are selected from a group consisting of rounded particles of walnut shells, hickory nut shells, pecan shells, wood chips, coconut husks and endocarps of drupes.

3. A method to increase the fluid flow capacity of a subterranean rock formation susceptible to dissolution by acid, comprising introducing into a well extending downwardly from the surface into the formation a first liquid, increasing pressure applied to the first liquid until the formation ruptures and forms a fracture therein, maintaining pressure on the first liquid sufficient to extend the fracture away from the well and through the formation, introducing into the well a second liquid containing porous, deformable, solid propping particles impregnated with a surfactant capable of rendering the formation surfaces resistant to chemical reaction with acid, displacing the second liquid and propping particles into the fracture away from the well, reducing pressure on the second liquid such that the fracture compresses the propping particles, thereby squeezing the surfactant onto the formation surfaces contiguous to the propping particles, and thereafter introducing an acid through the well and into the fracture.

4. A method to improve the flow capacity of a subterranean rock formation containing hydrocarbons comprising introducing liquid down a well into contact with the formation, said liquid containing porous, deformable propping particles impregnated with an oil-wet surfactant to render the formation hydrophobic, increasing pressure on the liquid to cause the formation to rupture thereby forming and extending a fracture therein, forcing the liquid and propping particles into the fracture, reducing the pressure on the liquid to permit the fracture to compress the propping particles, thereby forcing the oil-wet surfactant onto the formation surfaces contiguous to the propping particles, and thereafter introducing an aqueous acid solution through the well and into the fracture.

5. A method according to claim 4 wherein the propping particles comprise a particulate solid having porosity between five and 40%, permeability between 10 and 500 millidarcys, sufficient compressive strength to prevent the fracture from closing completely after the release of pressure on the fracturing liquid, and sufficient ability to deform under the weight of overlying rock formations to deposit a substantial volume of the oil-wet surfactant on the formation surfaces contiguous to the propping particles.

6. A method according to claim 4 wherein the oil-wet surfactant is a fatty acid ester of sorbitan and a carboxylic acid having from 10 to 30 carbon atoms per molecule, and the aqueous acid solution comprises a solution of hydrochloric acid.

7. A method according to claim 4 wherein the oil-wet surfactant is sorbitan trioleate and the aqueous acid solution comprises a solution of hydrochloric acid.

8. A method according to claim 4 wherein the oil-wet surfactant is sorbitan tristearate and the aqueous acid solution comprises a solution of hydrochloric acid.

9. A method according to claim 4 wherein the oil-wet surfactant is sorbitan monostearate and the aqueous acid solution comprises a solution of hydrochloric acid.

10. A method according to claim 4 wherein the oil-wet surfactant is sorbitan monolaurate and the aqueous acid solution comprises a solution of hydrochloric acid.

11. A method according to claim 7 wherein the propping particles are ground walnut shells.

12. A method for increasing the productive capacity of a subterranean rock formation penetrated by a well and susceptible to dissolution by acid comprising creating a fracture extending from the well into the formation, displacing into the fracture a liquid containing porous deformable propping particles impregnated with a surfactant capable of rendering the formation resistant to acid, maintaining pressure on the liquid sufficient to extend the fracture away from the well and through the formation, subsequently reducing pressure on the liquid such that the fracture compresses the propping particles thereby squeezing the surfactant onto the formation surfaces continguous to the propping particles, and thereafter introducing an acid into the fracture.

13. A method for increasing the productive capacity of a subterranean rock formation penetrated by a well and susceptible to dissolution by acid comprising creating a fracture extending from the well into the formation, displacing down the well and into the fracture a liquid containing porous deformable propping particles impregnated with a surfactant capable of rendering the formation resistant to acid, maintaining pressure on the liquid sufficient to extend the fracture away from the well and through the formation, subsequently reducing pressure on the liquid so that the fracture compresses the propping particles thereby squeezing the surfactant onto the formation surfaces contiguous to the propping particles, and thereafter displacing an acid down the well and into the fracture.

References Cited by the Examiner

UNITED STATES PATENTS 3,179,170  4/1965  Burtch et al. _____ 166—42.1 X

CHARLES E. O'CONNELL, *Primary Examiner.*

T. A. ZALENSKI, R. E. FAVREAU,
*Assistant Examiners.*